United States Patent
Zhang et al.

(10) Patent No.: US 9,510,221 B2
(45) Date of Patent: Nov. 29, 2016

(54) METHODS AND APPARATUSES FOR MEASURING PILOT (71) Applicant: ZTE Corporation, Shenzhen, Guangdong (CN)

(72) Inventors: Chenchen Zhang, Shenzhen (CN); Yunfeng Sun, Shenzhen (CN); Senbao Guo, Shenzhen (CN)

(73) Assignee: ZTE CORPORATION, Shenzhen, Guangdon (CN)

(*) Notice: Subject to any disclaimer, the term of this patent is extended or adjusted under 35 U.S.C. 154(b) by 39 days.

(21) Appl. No.: 14/419,895

(22) PCT Filed: Aug. 9, 2013

(86) PCT No.: PCT/CN2013/081240
§ 371 (c)(1),
(2) Date: Feb. 5, 2015

(87) PCT Pub. No.: WO2014/023267
PCT Pub. Date: Feb. 13, 2014

(65) Prior Publication Data
US 2015/0201340 A1    Jul. 16, 2015

(30) Foreign Application Priority Data
Aug. 9, 2012  (CN) .......... 2012 1 0282533

(51) Int. Cl.
*H04W 24/08* (2009.01)
*H04L 25/02* (2006.01)
(Continued)

(52) U.S. Cl.
CPC ........... *H04W 24/08* (2013.01); *H04B 7/0617* (2013.01); *H04B 7/0684* (2013.01); *H04L 25/0204* (2013.01); *H04L 25/0226* (2013.01); *H04W 16/28* (2013.01); *H04L 5/0048* (2013.01)

(58) Field of Classification Search
CPC .. H04W 24/08; H04W 16/28; H04B 7/0617; H04B 7/0421; H04B 7/0684; H04L 25/0226; H04L 25/0204; H04L 5/0048
See application file for complete search history.

(56) References Cited

U.S. PATENT DOCUMENTS

2010/0273499 A1    10/2010  Van Rensburg
2011/0235743 A1*    9/2011  Lee .............. H04L 5/0048
375/295

(Continued)

FOREIGN PATENT DOCUMENTS

CN    102468923 A    5/2012
CN    102468924 A    5/2012

(Continued)

OTHER PUBLICATIONS

Supplementary European Search Report in European application No. 13828200.9, mailed on Oct. 12, 2015.

(Continued)

*Primary Examiner* — Paul H Masur
*Assistant Examiner* — Kabir Jahangir
(74) *Attorney, Agent, or Firm* — Oppendahl Patent Law Firm LLC (57) ABSTRACT

A pilot measurement method is provided, which includes that a receiving end determines a port configuration for pilot measurement, and the receiving end receives a pilot signal using the port configuration, and obtains channel information upon an estimate. Correspondingly, a receiving end for pilot measurement is also provided. Even though the number of antenna ports is sharply increased, a part of ports still can be selected as the ports for transmitting a pilot signal according to needs, the number of the ports for transmitting the pilot signal can be unlimited, and the pilot configuration problem under the condition of sharp increase in the number of the antenna ports can be solved.

14 Claims, 2 Drawing Sheets

(51) Int. Cl.
*H04B 7/06* (2006.01)
*H04W 16/28* (2009.01)
*H04L 5/00* (2006.01)

(56) References Cited

U.S. PATENT DOCUMENTS

| | | | |
|---|---|---|---|
| 2011/0249767 A1 | 10/2011 | Chen | |
| 2012/0207119 A1* | 8/2012 | Zhang | H04L 5/0023 370/329 |
| 2013/0258964 A1 | 10/2013 | Nam et al. | |
| 2013/0316719 A1* | 11/2013 | Mazzarese | H04L 1/0026 455/450 |
| 2014/0314041 A1* | 10/2014 | Kim | H04L 5/0048 370/329 |
| 2015/0003271 A1* | 1/2015 | Park | H04L 27/2613 370/252 |
| 2015/0010106 A1* | 1/2015 | Skov | H04L 5/0048 375/295 |
| 2015/0124736 A1* | 5/2015 | Ko | H04B 7/0626 370/329 |

FOREIGN PATENT DOCUMENTS

| | | |
|---|---|---|
| EP | 2645616 A2 | 10/2013 |
| WO | 2010037285 A1 | 4/2010 |
| WO | 2011047351 A2 | 4/2011 |
| WO | 2011062066 A1 | 5/2011 |
| WO | 2012034444 A1 | 3/2012 |

OTHER PUBLICATIONS

DL MU-MIMO operation in LTE-A, mailed on Oct. 12, 2009.
International Search Report in international application No. PCT/CN2013/081240, mailed on Oct. 31, 2013.
English Translation of the Written Opinion of the International Search Authority in international application No. PCT/CN2013/081240, mailed on Oct. 31, 2013.

* cited by examiner

METHODS AND APPARATUSES FOR MEASURING PILOT

TECHNICAL FIELD

The disclosure relates to the field of Three-Dimensional (3D) beam-forming technology, and in particular to pilot measurement methods and apparatuses.

BACKGROUND

A 3D beam-forming technology is an important technology for improving cell resource utilization and solving an inter-cell interference problem, the basic idea of which is to simultaneously utilize beams in a horizontal direction and a perpendicular direction, so as to achieve higher space reusability and improve the throughput of a system.

The implementation of 3D beam-forming usually needs cooperation with multiple groups of antennae, which involves a pilot design problem under a complex antenna configuration. At present, during channel measurement in R10, different pilot configurations are adopted for different specific antenna port quantity, such as pilot configurations respectively supporting transmission through 1 port, transmission through 2 ports, transmission through 4 ports and transmission through 8 ports, and having corresponding pilot transmission patterns. In the future, the number of antenna ports may be sharply increased in many application scenarios, for example, 16 ports, 64 ports and the like may occur, at which moment, if pilot mapping still depends on the number of the antenna ports, then excessively high pilot overheads and excessive resource occupation will inevitably be caused, thereby affecting the spectral efficiency of the system. Therefore, it is necessary to improve the conventional pilot configurations for pilot measurement to solve the pilot configuration problem under the condition of sharp increase in the number of the antenna ports.

SUMMARY

To this end, the embodiments of the disclosure provide pilot measurement methods and apparatuses, to solve the pilot configuration problem under the condition of sharp increase in the number of antenna ports.

In order to achieve the purpose, technical solutions of the embodiments of the disclosure are implemented as follows.

An embodiment of the disclosure provides a pilot measurement method, which may include that:

a receiving end determines a port configuration for pilot measurement; and the receiving end receives a pilot signal using the port configuration, and obtains channel information upon an estimate.

In the solution, the step that the receiving end determines the port configuration for pilot measurement may include that: the receiving end receives corresponding port configuration information which is notified by network-side equipment after the network-side equipment determines a current port configuration for pilot measurement, and configures the corresponding port configuration information to itself.

In the solution, the notification of the corresponding port configuration information may be notifying the receiving end of the corresponding port configuration information through high-level signalling.

In the solution, the step of the receiving end determining a port configuration for pilot measurement may include that the receiving end configures the corresponding port configuration information to itself according to a predetermined port configuration for pilot measurement.

In the solution, the port configuration information is a bit string, the total number of bits of the bit string is the same as the number of ports, and each of the bits corresponds to one port and is configured to indicate whether the corresponding one port is configured to transmit or receive the pilot signal or not.

In the solution, that each of the bits corresponds to one port and is configured to indicate whether the corresponding one port is configured to transmit or receive the pilot signal or not may refer to that: the corresponding port is indicated to be a port for transmitting or receiving the pilot signal when the bit is 1, and is indicated not to be the port for transmitting or receiving the pilot signal if the bit is 0.

In the solution, the port configuration information is a bit string, the total number of the bits of the bit string is the same as the sum of the total row number of and total column number of the ports, and each of the bits corresponds to one row of ports or one column of ports, and is configured to indicate whether the ports in the corresponding one row or column are configured to transmit or receive the pilot signal or not.

In the solution, that each of the bits corresponds to one row of ports or one column of ports, and is configured to indicate whether the ports in the corresponding one row or column are configured to transmit or receive the pilot signal or not may refer to that: the ports in the corresponding one row or column are indicated to be ports for transmitting the pilot signal when the bit is 1, and are indicated not to be ports for transmitting the pilot signal if the bit is 0.

In the solution, the step of determining a port configuration for pilot measurement may include determining at least one port configuration for pilot measurement.

In the solution, one of the port configuration is that a part of ports in all the ports are specified to be the ports for transmitting the pilot signal.

In the solution, after the receiving end determines the port configuration for pilot measurement, the method further may include that: the receiving end receives corresponding time-domain configuration information and/or frequency-domain configuration information from a transmitting end after the transmitting end determines a time-domain configuration and/or a frequency-domain configuration corresponding to the port configuration.

In the solution, the time-domain configuration is that a specified port configuration is applied to a specified subframe or radio frame or Orthogonal Frequency Division Multiplexing (OFDM) symbol.

In the solution, when there are totally N rows and N columns of ports (N is an integer not smaller than 1), the port configuration may include N port configurations, wherein the nth port configuration is that the ports in the nth row and the ports in the nth column are configured to transmit or receive the pilot signal, and n is an integer not greater than N and not smaller than 1; and the time-domain configuration is that the N port configurations are applied to N specified subframes or radio frames or OFDM symbols, one port configuration is applied to one subframe or radio frame or OFDM symbol, and the same or different port configurations are applied to different subframes or radio frames or OFDM symbols.

In the solution, the frequency-domain configuration may be that a specified port configuration is applied to a specified bandwidth or sub-band or Resource Block Group (RBG) or RB.

In the solution, after the channel information is obtained upon the estimate, the method further may include that: one-dimensional or two-dimensional pre-coded information is obtained upon an estimate according to the channel information.

In the solution, after the one-dimensional or two-dimensional pre-coded information is obtained upon an estimate, the method further may include that the one-dimensional or two-dimensional pre-coded information is fed back to the transmitting end.

In the solution, feeding back the two-dimensional pre-coded information to the transmitting end may include feeding back the two-dimensional pre-coded information to the transmitting end in the same time domain, or feeding back the two-dimensional pre-coded information to the transmitting end in two different time domains respectively.

In the solution, the one-dimensional pre-coded information may include the pre-coded information of the ports in at least one row or column, and the two-dimensional pre-coded information may include the pre-coded information of the ports in at least one row and the pre-coded information of the ports in at least one column.

An embodiment of the disclosure also provides a receiving end for pilot measurement, which is configured to determine a port configuration for pilot measurement, receive a pilot signal using the determined port configuration for pilot measurement and obtain channel information upon an estimate.

In the solution, the receiving end may be further configured to receive high-level signalling carrying port configuration information from a network side to acquire the port configuration for pilot measurement.

In the solution, the receiving end may be further configured to configure the corresponding port configuration information to itself according to a predetermined port configuration for pilot measurement.

In the solution, the port configuration may include at least one port configuration for pilot measurement.

In the solution, one of the port configuration may be that a part of ports in all ports are specified to be ports for transmitting the pilot signal.

In the solution, the receiving end may be configured to receive the pilot signal using the determined port configuration for pilot measurement and a time-domain configuration and/or a frequency-domain configuration corresponding to the port configuration, and estimate the channel information.

In the solution, after obtaining the channel information upon the estimate, the receiving end may be also configured to estimate one-dimensional or two-dimensional pre-coded information according to the channel information.

In the solution, the receiving end may be further configured to feed back the one-dimensional or two-dimensional pre-coded information to a transmitting end.

In the solution, that the receiving end may be further configured to feed back the two-dimensional pre-coded information to the transmitting end may refer to that: the receiving end feeds back the two-dimensional pre-coded information to the transmitting end in the same time domain, or feeds back the two-dimensional pre-coded information to the transmitting end in two different time domains respectively.

An embodiment of the disclosure also provides a pilot measurement method, which includes that a transmitting end determines a port configuration for pilot measurement; and the transmitting end transmits a pilot signal using the port configuration.

In the solution, the step of the transmitting end determining a port configuration for pilot measurement may include that network-side equipment determines a current port configuration for pilot measurement, and configures corresponding port configuration information to itself.

In the solution, the step of the transmitting end determining a port configuration for pilot measurement may include that the transmitting end configures the corresponding port configuration information to itself according to a predetermined port configuration for pilot measurement.

In the solution, the port configuration information is a bit string, the total number of bits of the bit string is the same as the number of ports, and each of the bits corresponds to one port, and is configured to indicate whether the corresponding one port is configured to transmit or receive the pilot signal or not.

In the solution, that each of the bits corresponds to one port, and is configured to indicate whether the corresponding one port is configured to transmit or receive the pilot signal or not may refer to that: the corresponding one port is indicated to be a port for transmitting or receiving the pilot signal when the bit is 1, and is indicated not to be the port for transmitting or receiving the pilot signal if the bit is 0.

In the solution, the port configuration information is a bit string, the total number of the bits of the bit string is the same as the sum of the total row number of and total column number of the ports, and each of the bits corresponds to one row of ports or one column of ports, and is configured to indicate whether the ports in the corresponding one row or column are configured to transmit or receive the pilot signal or not.

In the solution, that each of the bits corresponds to one row or column of ports, and is configured to indicate whether the ports in the corresponding one row or column are configured to transmit or receive the pilot signal or not may refer to that: the ports in the corresponding one row or column are indicated to be ports for transmitting the pilot signal when the bit is 1, and are indicated not to be the ports for transmitting the pilot signal if the bit is 0.

In the solution, the step of determining a port configuration for pilot measurement may include determining at least one port configuration for pilot measurement.

In the solution, the port configuration may be that a part of ports in all the ports are specified to be the ports for transmitting the pilot signal.

In the solution, after the transmitting end determines a port configuration for pilot measurement, the method further may include that the transmitting end determines a time-domain configuration and/or a frequency-domain configuration corresponding to the port configuration.

In the solution, the time-domain configuration may be that a specified port configuration is applied to a specified subframe or radio frame or OFDM symbol.

In the solution, when there are totally N rows and N columns of ports (N is an integer not smaller than 1), the port configuration includes N port configurations, wherein the nth port configuration is that the ports in the nth row and the ports in the nth column are configured to transmit or receive the pilot signal, and n is an integer not greater than N and not smaller than 1; and the time-domain configuration is that the N port configurations are applied to N specified subframes or radio frames or OFDM symbols, one port configuration is applied to one subframe or radio frame or OFDM symbol, and the same or different port configurations are applied to different subframes or radio frames or OFDM symbols.

In the solution, the frequency-domain configuration may be that a specified port configuration is applied to a specified bandwidth or sub-band or RBG or RB.

An embodiment of the disclosure also provides a transmitting end for pilot measurement, which is configured to determine a port configuration for pilot measurement and transmit a pilot signal using the port configuration.

In the solution, the transmitting end is network-side equipment, and is configured to determine a current port configuration for pilot measurement and configure corresponding port configuration information to itself.

In the solution, the transmitting end may be configured to configure the corresponding port configuration information to itself according to a predetermined port configuration for pilot measurement.

In the solution, that the transmitting end is configured to determine a port configuration for pilot measurement may include the determination of at least one port configuration for pilot measurement.

In the solution, the port configuration may be that a part of ports in all ports are specified to be ports for transmitting the pilot signal.

In the solution, the transmitting end may be further configured to determine a time-domain configuration and/or a frequency-domain configuration corresponding to the port configuration.

By the pilot measurement methods and apparatuses according to the embodiments of the disclosure, the port configuration for pilot measurement. which can be predetermined according to actual needs, is that a part of ports are selected from all the ports as the ports for transmitting a pilot signal, and the receiving end receives the pilot signal based on the port configuration, and obtains, upon an estimate, the channel information. In such a way, even though the number of the antenna ports is sharply increased, a part of ports still can be selected from the ports as the ports for transmitting a pilot signal according to needs the number of the ports for transmitting a pilot signal can be unlimited, and the pilot configuration problem under the condition of sharp increase in the number of the antenna ports can be solved, so that excessive pilot overheads and serious resource occupation are effectively avoided, and the spectral efficiency of a system can be improved.

BRIEF DESCRIPTION OF THE DRAWINGS

In order to more clearly describe the embodiments of the disclosure or a technical solution in the prior art, the drawings needed by the description of the embodiments or the prior art will be simply introduced. The drawings described below are only some embodiments of the disclosure, and those skilled in the art definitely can obtain other drawings according to the drawings without any creative work.

DETAILED DESCRIPTION

Figure 1:
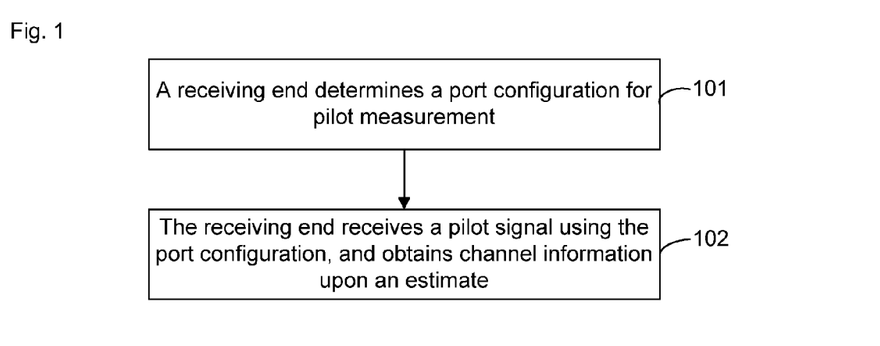
FIG. 1 is an implementation flowchart of a pilot measurement method according to an embodiment of the disclosure.

An embodiment of the disclosure provides a pilot measurement method, and as shown in FIG. 1, the method may include that:

Step 101: a receiving end determines a port configuration for pilot measurement;

here, a current port configuration for pilot measurement may be determined by network-side equipment, and corresponding port configuration information may be notified to the receiving end, wherein the corresponding port configuration information is notified through high-level signalling to the receiving end and a transmitting end, and wherein the network-side equipment is relative to customer premise equipment, and may be a base station, a low-power transmitting node, a network element of a core network, or the like;

or, the receiving end may configure the corresponding port configuration information to itself according to a predetermined port configuration for pilot measurement;

Step 102: the receiving end receives a pilot signal using the port configuration, and obtains channel information upon an estimate;

here, determining the port configuration for pilot measurement may include determining at least one port configuration for pilot measurement, wherein one of the port configuration is that a part of ports in all ports are specified as ports for transmitting the pilot signal.

Here, after the port configuration for pilot measurement is determined, the method further may include that the receiving end receives, from a transmitting end, corresponding time-domain configuration information and/or frequency-domain configuration information transmitted after the transmitting end determines a time-domain configuration and/or a frequency-domain configuration corresponding to the port configuration, wherein the time-domain configuration is that a specified port configuration is applied to a specified subframe, or radio frame or OFDM symbol; and the frequency-domain configuration is that a specified port configuration is applied to a specified bandwidth, or sub-band, or Resource Block Group (RBG) or Resource Block (RB).

Specifically, when there are totally N rows and N columns of ports (Ni is an integer not smaller than 1), there are N port configurations, wherein the nth port configuration is that the ports in the nth row and the ports in the nth column are configured to transmit or receive the pilot signal, and n is an integer not greater than N and not smaller than 1; and the time-domain configuration is that the N port configurations are applied to N specified subframes or radio frames or OFDM symbols, one port configuration is applied to one subframe or radio frame or OFDM symbol, and different port configurations are applied to different subframes or radio frames or OFDM symbols.

Here, after the channel information is obtained upon the estimate, the method further may include that: one-dimensional or two-dimensional pre-coded information is obtained upon an estimate according to the channel information. The one-dimensional pre-coded information may include the row-dimensional pre-coded information of the ports in at least one row or the column-dimensional pre-coded information of the ports in at least one column; and the two-dimensional pre-coded information may include the row-dimensional pre-coded information of the ports in at least one row and the column-dimensional pre-coded information of the ports in at least one column.

Here, after the one-dimensional or two-dimensional pre-coded information is obtained upon the estimate, the method further may include that the one-dimensional or two-dimensional pre-coded information is fed back to the transmitting end. Specifically, the receiving end can feed back the two-dimensional pre-coded information to the transmitting end in the same time domain, or feed back the two-dimensional pre-coded information to the transmitting end in two different time domains, respectively.

Correspondingly, an embodiment of the disclosure also provides a receiving end for pilot measurement, which is configured to determine a port configuration for pilot measurement, receive a pilot signal using the determined port configuration for pilot measurement and obtain channel information upon an estimate.

Here, the receiving end is further configured to receive high-level signalling carrying port configuration information from a network side to acquire the port configuration for pilot measurement.

Here, the receiving end is further configured to configure the corresponding port configuration information to itself according to a predetermined port configuration for pilot measurement.

The port configuration for pilot measurement included at least one port configuration. One of the port configuration is that a part of ports in all ports are specified to be ports for transmitting the pilot signal.

Here, the receiving end is configured to receive a pilot signal using the determined port configuration for pilot measurement and a time-domain configuration and/or frequency-domain configuration corresponding to the port configuration, and obtain channel information upon an estimate.

Here, after obtaining the channel information upon the estimate, the receiving end is further configured to estimate one-dimensional or two-dimensional pre-coded information according to the channel information.

Here, the receiving end is further configured to feed back the one-dimensional or two-dimensional pre-coded information to a transmitting end. Specifically, the receiving end feeds back the two-dimensional pre-coded information to the transmitting end in the same time domain, or feeds back the two-dimensional pre-coded information to the transmitting end in two different time domains, respectively.

Correspondingly, an embodiment of the disclosure also provides another pilot measurement method, which may include that a transmitting end determines a port configuration for pilot measurement, and the transmitting end transmits a pilot signal using the port configuration.

Here, the step that the transmitting end determines the port configuration for pilot measurement may include that network-side equipment determines a current port configuration for pilot measurement, and configures corresponding port configuration information to itself. Or, the step that the transmitting end determines the port configuration for pilot measurement may include that the transmitting end configures the corresponding port configuration information to itself according to a predetermined port configuration for pilot measurement.

The step of determining the port configuration for pilot measurement may include determining at least one port configuration for pilot measurement. Specifically, one of the port configuration is that a part of ports in all ports are specified to be ports for transmitting the pilot signal.

Here, after the transmitting end determines the port configuration for pilot measurement, the method further may include that the transmitting end determines a time-domain configuration and/or a frequency-domain configuration corresponding to the port configuration.

Specifically, the time-domain configuration is that a specified port configuration is applied to a specified subframe, or radio frame or OFDM symbol. The frequency-domain configuration is that a specified port configuration is applied to a specified bandwidth, or sub-band, or RBG or RB.

For example, when there are totally N rows and N columns of ports (N is an integer not smaller than 1), there are N port configurations, wherein the nth port configuration is that the ports in the nth row and the ports in the nth column are configured to transmit or receive the pilot signal, and n is an integer not greater than N and not smaller than 1; and the time-domain configuration is that the N port configurations are applied to N specified subframes or radio frames or OFDM symbols, one port configuration is applied to one subframe or radio frame or OFDM symbol, and the same or different port configurations are applied to the same or different subframes or radio frames or OFDM symbols.

Correspondingly, an embodiment of the disclosure also provides a transmitting end for pilot measurement, which is configured to determine a port configuration for pilot measurement and transmit a pilot signal using the port configuration.

Here, the transmitting end is network-side equipment, and is configured to determine a current port configuration for pilot measurement and configure corresponding port configuration information to itself. Or, the transmitting end is configured to configure the corresponding port configuration information to itself according to a predetermined port configuration for pilot measurement, wherein, that the transmitting end is configured to determine a port configuration for pilot measurement may include the determination of at least one port configuration for pilot measurement. Here, one of the port configuration is that a part of ports in all the ports are specified to be the ports for transmitting the pilot signal.

Here, the transmitting end is further configured to determine a time-domain configuration and/or a frequency-domain configuration corresponding to the port configuration.

Embodiment 1

In the embodiment, a process of pilot measurement may specifically include the following steps.

Step 1: a network side determines a port configuration for pilot measurement and a time-domain configuration corresponding to the port configuration, and notifies a receiving end of corresponding port configuration information and time-domain configuration information.

Figure 2:
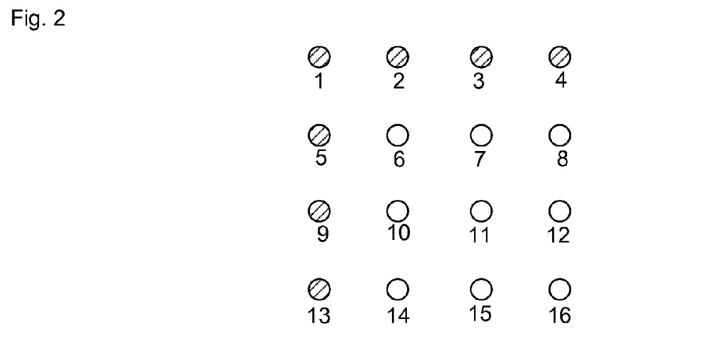
FIG. 2 is a diagram of a port configuration for pilot measurement according to embodiment 1 of the disclosure.

Specifically, the port configuration as shown in FIG. 2 is adopted in the embodiment, wherein there are totally 16 ports of which 7 ports (ports 1, 2, 3, 4, 5, 9 and 13) in a shaded area are ports for transmitting a pilot signal and 9 ports (ports 6, 7, 8, 10, 11, 12, 14, 15 and 16) in an unshaded area are ports which do not transmit the pilot signal. That is, in the embodiment, the ports in the first row and the ports in the first column are adopted to transmit pilot information.

The port configuration information of the port configuration can be configured on the network side in advance, and then is notified to the receiving end by network-side equipment. Here, the port configuration information may be a bit string which is configured to indicate a current port configuration, wherein the total number of bits of the bit string is the same as the number of the ports, and each of the bits corresponds to one port and is configured to indicate whether the corresponding port is configured to transmit or receive a pilot signal or not. Specifically, if a port is the port transmitting the pilot signal, then the bit corresponding to the port is set to be 1; if a port is not the port transmitting the pilot signal, then the bit corresponding to the port is set to be 0; and the bits in the bit string can correspond to the ports according to a row sequence as well as a column sequence. For example, for the port configuration as shown in FIG. 2 in the embodiment, the port configuration information may be 1111100010001000 according to the row sequence, wherein the first bit corresponds to the first port in the first row, the second bit corresponds to the second port in the first row, the third bit corresponds to the third port in the first row, the fourth bit corresponds to the third port in the first row, the fifth bit corresponds to the first port in the second row, and so on.

Here, the network-side equipment may notify the receiving end through high-level signalling carrying the port configuration information.

Figure 3:
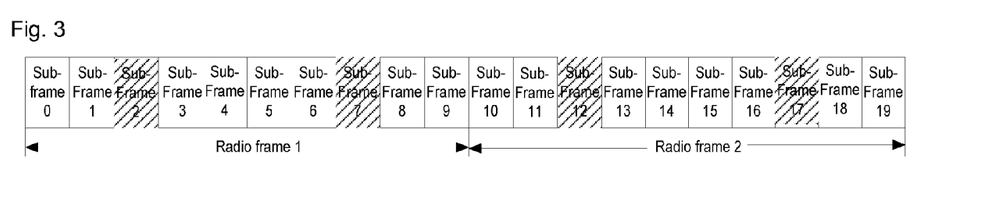
FIG. 3 is a diagram of a time-domain sequence which employs the port configuration as shown in FIG. 2 according to embodiment 1 of the disclosure.

In the embodiment, the time-domain configuration employing the above port configuration is as shown in FIG. 3, a subframe offset is 2, and a subframe period is 5, that is, the above port configuration is adopted to transmit a pilot signal at subframes, such as subframe 2, subframe 7, subframe 12 and subframe 17, consistent with the subframe offset and the subframe period. The network side notifies the receiving end of the time-domain configuration information of the pilot signal through the high-level signalling, and the time-domain configuration information may specifically include the subframe period and the subframe offset.

Step 2: a transmitting end transmits the pilot signal at the corresponding subframe indicated by the time-domain configuration and at the corresponding port indicated by the port configuration according to the port configuration and the time-domain configuration, and does not transmit the pilot signal at the other ports.

Step 3: the receiving end receives the pilot signal which are transmitted at the corresponding subframe and the corresponding port from the transmitting end according to the port configuration information and the time-domain configuration information, and performs channel estimation to obtain channel information according to the pilot signal.

Step 4: the receiving end obtains, upon the estimate, the pre-coded information of each port according to the channel information.

Specifically, the receiving end obtains the row-dimensional pre-coded information of the ports in the first row according to the channel information of the ports (i.e. ports 1, 2, 3 and 4 in FIG. 2) in the first row, then obtains the column-dimensional pre-coded information of the ports in the first column according to the channel information of the ports (i.e. ports 1, 5, 9 and 13 in FIG. 2) in the first column, and finally obtains the row-dimensional pre-coded information of the ports in each of the other rows and the column-dimensional pre-coded information of the ports in each of the other columns according to the row-dimensional pre-coded information and the column-dimensional pre-coded information.

Here, the space between every two antenna ports is relatively small, the pre-coded information among the antenna ports 1, 2, 3 and 4 may represent the pre-coded information among the ports in different columns, and the pre-coded information among the antenna ports 1, 5, 9 and 13 may represent the pre-coded information among the antenna ports in different rows, so that the receiving end may obtain the row-dimensional pre-coded information of the other rows and the column-dimensional pre-coded information of the other columns according to the arrangement of the antenna ports and the two-dimensional pre-coded information based on the phase information of the antenna port 1, wherein the two-dimensional pre-coded information may include the row-dimensional pre-coded information among the antenna ports 1, 2, 3 and 4, which represents the pre-coded information of a horizontal plane, and the column-dimensional pre-coded information among the antenna ports 1, 5, 9 and 13, which represents the pre-coded information of a vertical plane.

Step 5: the receiving end feeds back the obtained two-dimensional pre-coded information to the transmitting end.

Here, after finishing channel estimation and pre-coded information estimation, the receiving end may directly feed back the two-dimensional pre-coded information (i.e. the row-dimensional pre-coded information and the column-dimensional pre-coded information) to the transmitting end, and then the transmitting end may receive the two-dimensional pre-coded information and calculate the required 3D pre-coded information of all the ports according to the arrangement of the ports.

Embodiment 2

In the embodiment, a process of pilot measurement may specifically include the following steps.

Step 1: a network side determines a port configuration for pilot measurement and a time-domain configuration corresponding to the port configuration, and notifies a receiving end of corresponding port configuration information and time-domain configuration information.

Figure 4:
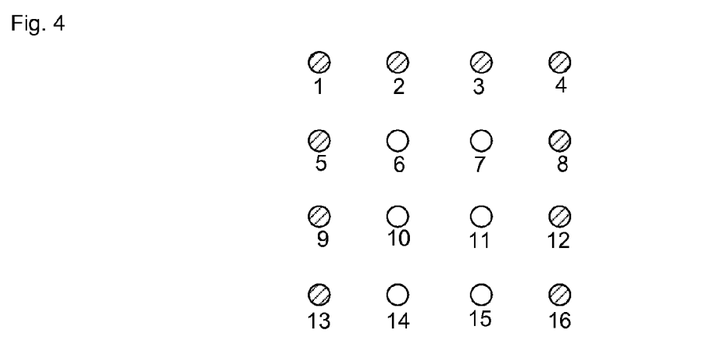
FIG. 4 is a diagram of a port configuration for pilot measurement according to embodiment 2 of the disclosure.

Specifically, the port configuration as shown in FIG. 4 is adopted in the embodiment, wherein there are totally 16 ports of which 10 ports (ports 1, 2, 3, 4, 5, 8, 9, 12, 13 and 16) in a shaded area are ports for transmitting a pilot signal and 6 ports (ports 6, 7, 10, 11, 14 and 15) in an unshaded area are ports which do not transmit the pilot signal. That is, in the embodiment, the ports in the first row, the ports in the first column and the ports in the fourth column are adopted to transmit pilot information.

The port configuration is implemented by an explicit signalling notification method in the embodiment, and specifically, the port configuration information of the above port configuration may be configured at the network side in advance, and then is notified to the receiving end by network-side equipment. Here, the port configuration information may be a bit string which is configured to indicate a current port configuration, wherein the total number of bits of the bit string is the same as the sum of the total row number and total column number of the ports, and each of the bits corresponds to one row or one column, and is configured to indicate whether the ports in the corresponding row or column are configured to transmit or receive the pilot signal or not; if one of the row or column of ports are the ports transmitting the pilot signal, then the bit corresponding to the row or column is set to be 1; if one row or column of ports are not the ports transmitting the pilot signal, then the bit corresponding to the row or column is set to be 0; and the bits in the bit string may correspond to rows or columns in such a manner that the former four bits represent the rows and the latter four bits represent the columns, the first bit represents the first row, the second bit represents the second row, . . . , the fifth bit represents the first column, and so on. For example, for the port configuration as shown in FIG. 4 in the embodiment, the port configuration information may be 10001001, wherein the first bit corresponds to the ports in the first row, the second bit corresponds to the ports in the second row, the third bit corresponds to the ports in the third row, the fourth bit corresponds to the ports in the fourth row, the fifth bit corresponds to the ports in the first column, and so on.

Here, the network side may transmit high-level signalling carrying the port configuration information to the receiving end so as to notify the receiving end.

In the embodiment, a time-domain sequence employing the port configuration is as shown in FIG. 3, a subframe offset is 2, and a subframe period is 5, that is, the port configuration is adopted to transmit the pilot signal at subframes, such as subframe 2, subframe 7, subframe 12 and subframe 17, consistent with the subframe offset and the subframe period. The network side notifies the receiving end of the time-domain configuration information of the pilot signal through the high-level signalling, and the time-domain configuration information may specifically include the subframe period and the subframe offset.

Step 2: a transmitting end transmits the pilot signal at the corresponding subframe indicated by the time-domain configuration and at the corresponding port indicated by the port configuration according to the port configuration and the time-domain configuration, and does not transmit the pilot signal at the other ports.

Step 3: the receiving end receives the pilot signal which are transmitted at the corresponding subframe and the corresponding port from the transmitting end according to the port configuration information and the time-domain configuration information, and performs channel estimation to obtain channel information according to the pilot signal.

Step 4: the receiving end obtains, upon the estimate, the pre-coded information of each port according to the channel information.

Specifically, the receiving end obtains, upon the estimate the row-dimensional pre-coded information of the ports in the first row according to the channel information of the ports (i.e. ports 1, 2, 3 and 4 in FIG. 4) in the first row, then obtains, upon the estimate, the column-dimensional pre-coded information of the ports in the first column according to the channel information of the ports (i.e. ports 1, 5, 9 and 13 in FIG. 4) in the first column, obtains, upon the estimate, the column-dimensional pre-coded information of the ports in the fourth column according to the channel information of the ports (i.e. ports 4, 8, 12 and 16 in FIG. 4) in the fourth column, and obtains an average value of the column-dimensional pre-coded information of the ports in the first column and the column-dimensional pre-coded information of the ports in the fourth column, and finally obtains the row-dimensional pre-coded information of the ports in each of the other rows and the column-dimensional pre-coded information of the ports in each of the other columns according to the row-dimensional pre-coded information of the ports in the first row and the average value of the column-dimensional pre-coded information of the ports in the first column and the column-dimensional pre-coded information of the ports in the fourth column.

Step 4 is completely the same as the step 4 in embodiment 1.

Embodiment 3

In the embodiment, a process of pilot measurement may specifically include the following steps.

Step 1: a transmitting end determines a port configuration for pilot measurement and a time-domain configuration according to a preset port configuration, wherein port configuration information is preset, so that a receiving end is not required to be notified by signalling, and the transmitting end is only required to notify the receiving end of the time-domain configuration information.

Figure 5:
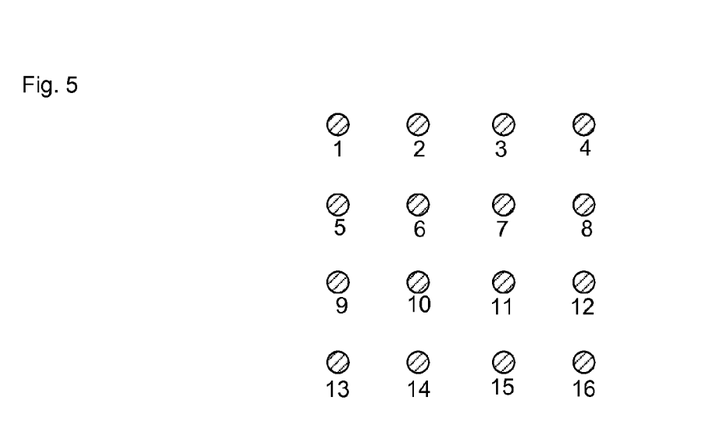
FIG. 5 is a diagram of a port configuration for pilot measurement according to embodiment 3 of the disclosure.

Specifically, the port configuration as shown in FIG. 5 is adopted in the embodiment, and there are four port configurations in FIG. 5, wherein the first port configuration is the same as that in FIG. 1, that is, ports (ports 1, 2, 3 and 4) in the first row and ports (ports 1, 5, 9 and 13) in the first column are adopted to transmit pilot information; the second port configuration is that the ports (ports 2, 6, 10 and 14) in the second column and the ports (ports 5, 6, 7 and 8) in the second row are adopted to transmit the pilot information; the third port configuration is that the ports (ports 3, 7, 11 and 15) in the third column and the ports (ports 9, 10, 11 and 12) in the third row are adopted to transmit the pilot information; and the fourth port configuration is that the ports (ports 4, 8, 12 and 16) in the fourth column and the ports (ports 13, 14, 15 and 16) in the fourth row are adopted to transmit the pilot information.

The port configuration is implemented by an implicit notification method in this embodiment, and specifically, the above four port configurations are predetermined, and four types of port configuration information are correspondingly configured at the transmitting end and the receiving end using the four predetermined port configurations to realize the configuration of the four port configurations at the transmitting end and the receiving end. Here, a predetermination manner is a protocol-based manner.

Figure 6:
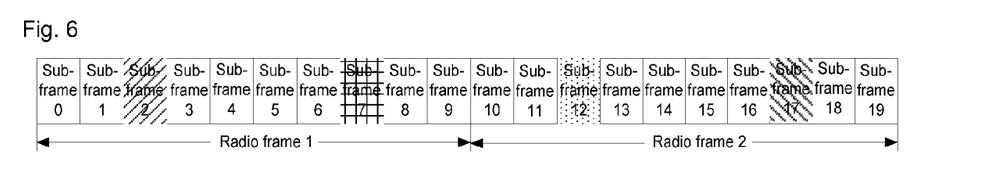
FIG. 6 is a diagram of a time-domain sequence which employs the port configuration as shown in FIG. 2 according to embodiment 3 of the disclosure.

In the embodiment, the corresponding time-domain configuration is as shown in FIG. 6, and there is one time-domain configuration which specifically is that a subframe offset is 2 and a subframe period is 5, that is, one of the four port configurations is adopted to transmit a pilot signal at subframes, such as subframe 2, subframe 7, subframe 12 and subframe 17, consistent with the subframe offset and the subframe period respectively. Specifically, one port configuration is adopted for one subframe, and different port configurations are adopted for different subframes, for example, the first port configuration may be adopted for the subframe 2, the second port configuration may be adopted for the subframe 7, the third port configuration may be adopted for the subframe 12, and the fourth port configuration may be adopted for the subframe 17; the four port configurations are adopted for the four subframes respectively, and the ports for transmitting or receiving the pilot signal in the four port configurations cover all the ports, so that the receiving end may obtain the row-dimensional pre-coded information of different rows and the column-dimensional pre-coded information of different columns at different subframes, and these pieces of pre-coded information are integrated to obtain the row-dimensional pre-coded information of all the rows and the column-dimensional pre-coded information of all the columns to facilitate improvement in the pre-coded information estimation efficiency and accuracy of the receiving end.

Step 2: the transmitting end transmits the pilot signal at the corresponding subframe indicated by the time-domain configuration and at the corresponding port indicated by the port configuration according to the port configuration and the time-domain configuration, and does not transmit the pilot signal at the other ports.

Step 3: the receiving end receives the pilot signal which are transmitted at the corresponding subframe and the corresponding port from the transmitting end according to the preset port configuration information and the time-domain configuration information notified by the transmitting end, and performs channel estimation to obtain channel information according to the pilot signal.

Specifically, the receiving end obtains the channel information at the subframes consistent with the subframe offset of 2 and the subframe period of 5, according to the port configuration information and the received a pilot signal.

Step 4: the receiving end obtains, upon the estimate, two-dimensional pre-coded information according to the channel information.

Specifically, at the subframe where the first port configuration is adopted, the receiving end obtains, upon the estimate, the row-dimensional pre-coded information of the ports in the first row according to the channel information of the ports (i.e. ports 1, 2, 3 and 4 in FIG. 5) in the first row, and obtains, upon the estimate, the column-dimensional pre-coded information of the ports in the first column according to the channel information of the ports (i.e. ports 1, 5, 9 and 13) in FIG. 5) in the first column.

Similarly, at the subframe where the second port configuration is adopted, the receiving end obtains, upon the estimate, the row-dimensional pre-coded information of the ports in the second row and the column-dimensional pre-coded information of the ports in the second column respectively; at the subframe where the third port configuration is adopted, the receiving end obtains, upon the estimate, the row-dimensional pre-coded information of the ports in the third row and the column-dimensional pre-coded information of the ports in the third column respectively; and at the subframe where the fourth port configuration is adopted, the receiving end obtains, upon the estimate, the row-dimensional pre-coded information of the ports in the fourth row and the column-dimensional pre-coded information of the ports in the fourth column respectively.

Step 5: the receiving end feeds back the estimated two-dimensional pre-coded information to the transmitting end.

Specifically, the receiving end may feed back the two-dimensional pre-coded information (i.e. each row-dimensional pre-coded information and each column-dimensional pre-coded information) to the transmitting end in the same time domain.

Or, the receiving end may also feed back the two-dimensional pre-coded information to the transmitting end at two different time domains. For example, the receiving end may feed back each row-dimensional pre-coded information to the transmitting end in a specific time domain (such as a specific subframe, or radio frame or OFDM symbol), and feed back each column-dimensional pre-coded information to the transmitting end in another different specific time domain (such as another different specific subframe, or radio frame or OFDM symbol).

Embodiment 4

In the embodiment, a process of pilot measurement may specifically include the following steps.

Step 1: a network side determines a port configuration for pilot measurement and a time-domain configuration, and notifies a receiving end of corresponding port configuration information and time-domain configuration information.

Figure 7:
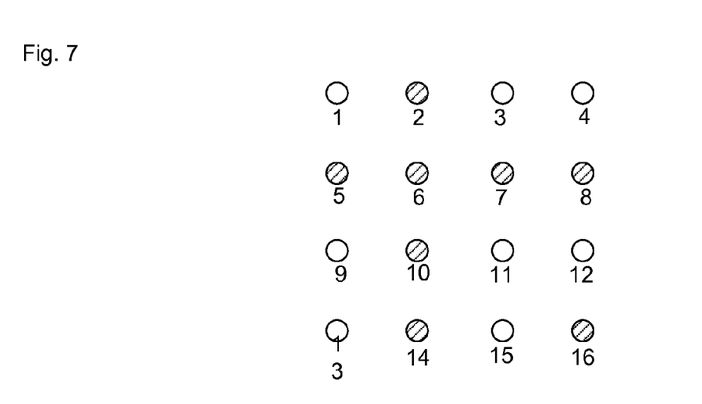
FIG. 7 is a diagram of a port configuration for pilot measurement according to embodiment 4 of the disclosure.

Specifically, the port configuration as shown in FIG. 7 is adopted in this embodiment, wherein there are totally 16 ports of which 8 ports (ports 2, 5, 6, 7, 8, 10, 14 and 16) in a shaded area are ports for transmitting a pilot signal and 8 ports (ports 1, 3, 4, 9, 11, 12, 13 and 15) in an unshaded area are ports which do not transmit the pilot signal. That is, in this embodiment, the ports in the second row, the ports in the second column and the port 16 are adopted to transmit pilot information.

The port configuration is implemented by an explicit signalling notification method in this embodiment, and specifically, the port configuration information of the port configuration may be configured on the network side in advance, and then is notified to the receiving end by network-side equipment. Here, the port configuration information may be a bit string which is configured to indicate a current port configuration, wherein the total number of bits of the bit string is the same as the number of the ports, and each of the bits corresponds to one port; if a port is the port transmitting the pilot signal, the bit corresponding to the port is set to be 1; and if a port is not the port transmitting the pilot signal, the bit corresponding to the port is set to be 0; and the bits in the bit string may correspond to the ports according to a row sequence or a column sequence. For example, for the port configuration as shown in FIG. 7 in this embodiment, the port configuration information may be 0100111101000101 according to the row sequence, wherein the first bit corresponds to the first port in the first row, the second bit corresponds to the second port in the first row, the third bit corresponds to the third port in the first row, the fourth bit corresponds to the third port in the first row, the fifth bit corresponds to the first port in the second row, and so on.

Here, the network side may notify the receiving end by transmitting high-level signalling carrying the port configuration information to the receiving end.

In this embodiment, a time-domain sequence adopting the port configuration is as shown in FIG. 3, a subframe offset is 2, and a subframe period is 5, that is, the port configuration is adopted to transmit the pilot signal at subframes, such as subframe 2, subframe 7, subframe 12 and subframe 17, consistent with the subframe offset and the subframe period. The network side notifies the receiving end of the time-domain configuration information of the pilot signal through the high-level signalling, and specific signalling may include the subframe period and the subframe offset.

Step 2: the pilot signal are transmitted at the corresponding subframe indicated by the time-domain configuration and at the corresponding port indicated by the port configuration according to the port configuration and the time-domain configuration, and are not transmitted at the other ports.

Step 3: the receiving end receives the pilot signal which are transmitted at the corresponding subframe and the corresponding port from a transmitting end according to the port configuration information, and performs channel estimation to obtain channel information according to the pilot signal.

Step 4: the receiving end obtains, upon the estimate, the pre-coded information of each port according to the channel information.

Specifically, the receiving end performs spatial interpolation processing on the channel information of 8 ports, which consists of the ports in the second row, the ports in the second column and the port 16, to obtain the channel information of all of the 16 ports to further obtain each row-dimensional pre-coded information and each column-dimensional pre-coded information.

Step 5: the receiving end feeds back the obtained two-dimensional pre-coded information to the transmitting end. A specific feedback manner is the same as that in Step 4 in embodiment 3.

In each of the above embodiments, the estimation of the pre-coded information according to the channel information can be implemented by a spatial interpolation manner. After the port configuration for pilot measurement is determined, the time-domain configuration, i.e. which subframe, or radio frame or OFDM symbol would be configured to apply a specified port and the like, may further be specified according to actual needs, and a frequency-domain configuration corresponding to the port configuration, i.e. which bandwidth, or sub-band, or RBG or RB would be configured to apply a specified port configuration and the like, may also be specified according to actual needs. Here, the frequency-domain configuration may specifically be that a specified port configuration is applied to a specified bandwidth, or sub-band, or RBG or RB, wherein, the same port configuration or different port configurations may be applied to different bandwidths, or sub-bands, or RBGs or RBs. The time-domain configuration may specifically be that a specified port configuration is applied to a specified subframe, or radio frame or OFDM symbol. In such a way, the same port configuration or different port configurations may be applied to different subframes, or radio frames or OFDM symbols. In a practical application, the frequency-domain configuration and/or the time-domain configuration may be notified to the transmitting end or the receiving end through the high-level signalling after being determined by the network side, and may also be directly configured at the transmitting end and the receiving end.

It should be noted that the ports in the embodiments of the disclosure may be any kind of physical antenna ports, or may be pilot ports, and each port configuration may be a static and/or quasi-static and/or dynamic configuration.

The above are only the preferred embodiments of the disclosure and are not intended to limit the scope of protection of the disclosure.

What is claimed is:

1. A pilot measurement method, comprising:
   determining, by a receiving end, a port configuration for pilot measurement; and
   receiving, by the receiving end, a pilot signal using the port configuration, and obtaining channel information upon an estimate,
   wherein after determining, by the receiving end, the port configuration for pilot measurement, the method further comprises:
   receiving, by the receiving end, corresponding time-domain configuration information and/or frequency-domain configuration information from a transmitting end after the transmitting end determines a time-domain configuration and/or a frequency-domain configuration corresponding to the port configuration,
   wherein the time-domain configuration is that a specified port configuration is applied to a specified subframe or radio frame or Orthogonal Frequency Division Multiplexing (OFDM) symbol;
   the frequency-domain configuration is that a specified port configuration is applied to a specified bandwidth or sub-band or Resource Block Group (RBG) or Resource Block (RB),
   wherein when there are totally N rows and N columns of ports (N is an integer not smaller than 1), the port configuration comprises N port configurations, wherein a nth port configuration is that ports in a nth row and ports in a nth column are configured to transmit or receive the pilot signal, and n is an integer not greater than N and not smaller than 1; and
   the time-domain configuration is that the N port configurations are applied to N specified subframes or radio frames or OFDM symbols, one port configuration is applied to one subframe or radio frame or OFDM symbol, and a same port configuration or different port configurations is or are applied to different subframes or radio frames or OFDM symbols.

2. The pilot measurement method according to claim 1, wherein the determining, by a receiving end, a port configuration for pilot measurement comprises:
   receiving, by the receiving end, corresponding port configuration information which is notified by network-side equipment after the network-side equipment determines a current port configuration for pilot measurement, and configuring the corresponding port configuration information to the receiving end itself; or
   configuring, by the receiving end, corresponding port configuration information to itself according to a predetermined port configuration for pilot measurement.

3. The pilot measurement method according to claim 2, wherein the notification of the corresponding port configuration information is notifying the receiving end of the corresponding port configuration information through high-level signalling.

4. The pilot measurement method according to claim 3, wherein the port configuration information is a bit string, a total number of bits of the bit string is the same as the number of ports, and each of the bits corresponds to one port and is configured to indicate whether the corresponding one port is configured to transmit or receive the pilot signal or not, wherein the corresponding one port is indicated to be a port for transmitting or receiving the pilot signal when the bit is 1; and the corresponding one port is indicated not to be the port for transmitting or receiving the pilot signal if the bit is 0; or
   the port configuration information is a bit string, a total number of bits of the bit string is the same as a sum of a total row number of and a total column number of ports, and each of the bits corresponds to one row of ports or one column of ports, and is configured to indicate whether the ports in the corresponding one row or column are configured to transmit or receive the pilot signal or not.

5. The pilot measurement method according to claim 1, wherein the determining a port configuration for pilot measurement comprises: determining at least one port configuration for pilot measurement, wherein one of the port configuration is that a part of ports in all ports are specified to be ports for transmitting the pilot signal.

6. The pilot measurement method according to claim 1, after obtaining the channel information upon the estimate, the method further comprising:
   obtaining, upon an estimate, one-dimensional or two-dimensional pre-coded information according to the channel information, and feeding back the one-dimensional or two-dimensional pre-coded information to a transmitting end.

7. The pilot measurement method according to claim 6, wherein feeding back the two-dimensional pre-coded information to the transmitting end comprises feeding back the two-dimensional pre-coded information to the transmitting end in a same time domain, or feeding back the two-dimensional pre-coded information to the transmitting end in two different time domains, respectively;
   the one-dimensional pre-coded information comprises pre-coded information of ports in at least one row or pre-coded information of ports in at least one column; and the two-dimensional pre-coded information comprises the pre-coded information of the ports in at least one row and the pre-coded information of the ports in at least one column.

8. A receiving end for pilot measurement, the receiving end comprising a computer processor and a non-transitory computer storage medium storing computer readable instructions, the receiving end configured to determine a port configuration for pilot measurement, receive a pilot signal from a transmitting end using the determined port configuration for pilot measurement and obtain channel information upon an estimate,
   wherein the receiving end is further configured to receive corresponding time-domain configuration information and/or frequency-domain configuration information from the transmitting end,
   wherein the time-domain configuration is that a specified port configuration is applied to a specified subframe or radio frame or Orthogonal Frequency Division Multiplexing (OFDM) symbol;
   the frequency-domain configuration is that a specified port configuration is applied to a specified bandwidth or sub-band or Resource Block Group (RBG) or Resource Block (RB);
   wherein when there are totally N rows and N columns of ports (N is an integer not smaller than 1), the port configuration comprises N port configurations, wherein a nth port configuration is that ports in a nth row and ports in a nth column are configured to transmit or receive the pilot signal, and n is an integer not greater than N and not smaller than 1; and
   the time-domain configuration is that the N port configurations are applied to N specified subframes or radio frames or OFDM symbols, one port configuration is applied to one subframe or radio frame or OFDM symbol, and a same port configuration or different port configurations is or are applied to different subframes or radio frames or OFDM symbols.

9. The receiving end according to claim 8, wherein the receiving end is further configured to receive high-level signalling carrying port configuration information from a network side to acquire the port configuration for pilot measurement, or to configure corresponding port configuration information to itself according to a predetermined port configuration for pilot measurement; or
   the receiving end is further configured to, after obtaining the channel information upon the estimate, obtain one-dimensional or two-dimensional pre-coded information upon an estimate according to the channel information, and feed back the one-dimensional or two-dimensional pre-coded information to a transmitting end.

10. The receiving end according to claim 9, wherein that the receiving end is further configured to feed back the two-dimensional pre-coded information to the transmitting end refers to that:
   the receiving end feeds back the two-dimensional pre-coded information to the transmitting end in a same time domain, or feeds back the two-dimensional pre-coded information to the transmitting end in two different time domains, respectively.

11. A pilot measurement method, comprising:
   determining, by a transmitting end, a port configuration for pilot measurement; and
   transmitting, by the transmitting end, a pilot signal using the port configuration,
   wherein after determining, by the transmitting end, the port configuration for pilot measurement, the method further comprises:
   determining, by the transmitting end, a time-domain configuration and/or a frequency-domain configuration corresponding to the port configuration,
   wherein the time-domain configuration is that a specified port configuration is applied to a specified subframe or radio frame or Orthogonal Frequency Division Multiplexing (OFDM) symbol;
   the frequency-domain configuration is that a specified port configuration is applied to a specified bandwidth or sub-band or Resource Block Group (RBG) or Resource Block (RB);
   wherein when there are totally N rows and N columns of ports (N is an integer not smaller than 1), the port configuration comprises N port configurations, wherein a nth port configuration is that ports in a nth row and ports in a nth column are configured to transmit or receive the pilot signal, and n is an integer not greater than N and not smaller than 1; and
   the time-domain configuration is that the N port configurations are applied to N specified subframes or radio frames or OFDM symbols, one port configuration is applied to one subframe or radio frame or OFDM symbol, and a same port configuration or different port configurations is or are applied to different subframes or radio frames or OFDM symbols.

12. The pilot measurement method according to claim 11, wherein the transmitting end obtains port configuration information after determining the port configuration; wherein
   the port configuration information is a bit string, a total number of bits of the bit string is the same as the number of ports, and each of the bits corresponds to one port and is configured to indicate whether the corresponding port is configured to transmit or receive the pilot signal or not, where the corresponding one port is indicated to be a port for transmitting or receiving the pilot signal when the bit is 1, and the corresponding one port is indicated not to be the port for transmitting or receiving the pilot signal if the bit is 0; or
   the port configuration information is a bit string, a total number of bits of the bit string is the same as a sum of a total row number of and a total column number of ports, and each of the bits corresponds to one row of ports or one column of ports, and is configured to indicate whether the ports in the corresponding one row or column are configured to transmit or receive the pilot signal or not.

13. A transmitting end for pilot measurement, the transmitting end comprising a computer processor and a non-transitory computer storage medium storing computer readable instructions, the transmitting end configured to determine a port configuration for pilot measurement and transmit a pilot signal to a receiving end using the port configuration,
   wherein the transmitting end is further configured to determine a time-domain configuration and/or a frequency-domain configuration corresponding to the port configuration,
   wherein the time-domain configuration is that a specified port configuration is applied to a specified subframe or radio frame or Orthogonal Frequency Division Multiplexing (OFDM) symbol;
   the frequency-domain configuration is that a specified port configuration is applied to a specified bandwidth or sub-band or Resource Block Group (RBG) or Resource Block (RB);
   wherein when there are totally N rows and N columns of ports (N is an integer not smaller than 1), the port configuration comprises N port configurations, wherein a nth port configuration is that ports in a nth row and ports in a nth column are configured to transmit or receive the pilot signal, and n is an integer not greater than N and not smaller than 1; and the time-domain configuration is that the N port configurations are applied to N specified subframes or radio frames or OFDM symbols, one port configuration is applied to one subframe or radio frame or OFDM symbol, and a same port configuration or different port configurations is or are applied to different subframes or radio frames or OFDM symbols.

14. The transmitting end according to claim 13, wherein the transmitting end is network-side equipment, and is configured to determine a current port configuration for pilot measurement and configure corresponding port configuration information to itself;

wherein the current port configuration for pilot measurement is that all ports or a part of ports in all ports are specified to be ports for transmitting the pilot signal.

* * * * *

UNITED STATES PATENT AND TRADEMARK OFFICE
CERTIFICATE OF CORRECTION

PATENT NO. : 9,510,221 B2  
APPLICATION NO. : 14/419895  
DATED : November 29, 2016  
INVENTOR(S) : Chenchen Zhang, Yunfeng Sun and Senbao Guo Page 1 of 1

It is certified that error appears in the above-identified patent and that said Letters Patent is hereby corrected as shown below:

On the Title Page

Attorney, Agent or Firm should read: Oppedahl Patent Law Firm LLC

Signed and Sealed this
Twelfth Day of May, 2020

Andrei Iancu
*Director of the United States Patent and Trademark Office*